US009009514B2

(12) United States Patent
Tabatabai et al.

(10) Patent No.: US 9,009,514 B2
(45) Date of Patent: Apr. 14, 2015

(54) SYSTEM AND METHOD FOR SWITCHING IN AN ENERGY EFFICIENT NETWORK

(75) Inventors: Mohammad Tabatabai, Newport Beach, CA (US); Richard Togashi, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 442 days.

(21) Appl. No.: 13/603,390

(22) Filed: Sep. 4, 2012

(65) Prior Publication Data

US 2013/0275792 A1 Oct. 17, 2013

Related U.S. Application Data

(60) Provisional application No. 61/622,582, filed on Apr. 11, 2012.

(51) Int. Cl.
G06F 1/32 (2006.01)
G06F 1/26 (2006.01)

(52) U.S. Cl.
CPC ............... *G06F 1/3203* (2013.01); *Y02B 60/34* (2013.01); *G06F 1/3206* (2013.01); *G06F 1/266* (2013.01)

(58) Field of Classification Search
CPC ..... G06F 1/3203; G06F 1/3206; G06F 1/266; Y02B 60/34
See application file for complete search history.

(56) References Cited

U.S. PATENT DOCUMENTS 6,125,448 A * 9/2000 Schwan et al. ................ 713/300
2012/0188885 A1 * 7/2012 Tazebay et al. ............... 370/252

* cited by examiner

*Primary Examiner* — Thuan Du
(74) *Attorney, Agent, or Firm* — Duane S. Kobayashi

(57) ABSTRACT

A system and method for switching in an energy efficient network. Rapid switching between multiple operating modes can generate a voltage spike or voltage lag on an on-board inductor. Suppression of the voltage spike or voltage lag can be enabled through the activation of by a physical layer device of an inductor bypass path at a time proximate to the switching between multiple operating modes.

20 Claims, 3 Drawing Sheets

SYSTEM AND METHOD FOR SWITCHING IN AN ENERGY EFFICIENT NETWORK

This application claims priority to provisional patent application No. 61/622,582, filed Apr. 11, 2012, which is incorporated by reference herein, in its entirety, for all purposes.

BACKGROUND

1. Field of the Invention

The present invention relates generally to networking, and more particularly, to a system and method for switching in an energy efficient network.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient Ethernet networks (IEEE 802.3az) has arisen to address the rising costs of IT equipment usage as a whole (i.e., PCs, displays, printers, switches, servers, network equipment, etc.).

In designing an energy efficient solution, one of the considerations is network link utilization. For example, many network links are typically in an idle state between sporadic bursts of data traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. Implementation of various solutions in various applications is based on an energy efficiency control policy that can govern the behavior of a network device in achieving energy savings.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy efficient networks attempt to save power when the traffic utilization of the network is not at its maximum capacity. This serves to minimize the performance impact while maximizing energy savings. At a broad level, an energy efficiency control policy for a particular link in the network determines when to enter an energy saving state, what energy saving state (i.e., level of energy savings) to enter, how long to remain in that energy saving state, what energy saving state to transition to out of the previous energy saving state, etc. In one embodiment, energy efficiency control policies can base these energy-saving decisions on a combination of settings established by an IT manager and the properties of the traffic on the link itself.

Figure 1:
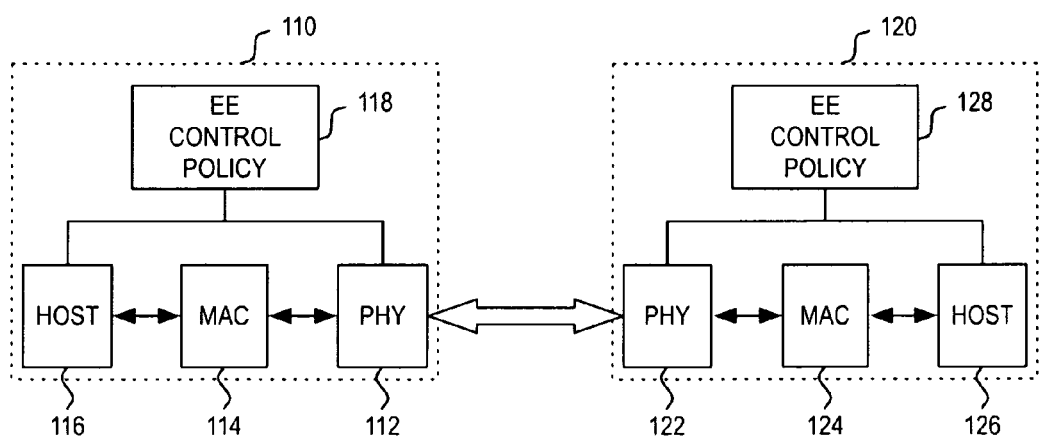
FIG. 1 illustrates an Ethernet link between link partners.

FIG. 1 illustrates an example link to which an energy efficiency control policy can be applied. As illustrated, the link supports communication between a first link partner 110 and a second link partner 120. In various embodiments, link partners 110 and 120 can represent a switch, router, endpoint (e.g., server, client, VOIP phone, wireless access point, etc.), or the like. As illustrated, link partner 110 includes physical layer device (PHY) 112, media access control (MAC) 114, and host 116, while link partner 120 includes PHY 122, MAC 124, and host 126.

In general, hosts 116 and 126 can comprise suitable logic, circuitry, and/or code that can enable operability and/or functionality of the five highest functional layers for data packets that are to be transmitted over the link. Since each layer in the OSI model provides a service to the immediately higher interfacing layer, MAC controllers 114 and 124 can provide the necessary services to hosts 116 and 126 to ensure that packets are suitably formatted and communicated to PHYs 112 and 122, respectively. MAC controllers 114 and 124 can comprise suitable logic, circuitry, and/or code that can enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

As FIG. 1 further illustrates, link partners 110 and 120 also include energy efficiency control policy entities 118 and 128, respectively. In general, energy efficiency control policy entities 118 and 128 can be designed to determine when to enter an energy saving state, what energy saving state (i.e., level of energy savings) to enter, how long to remain in that energy saving state, what energy saving state to transition to out of the previous energy saving state, etc.

In general, energy efficiency control policy entities 118 and 128 can comprise suitable logic, circuitry, and/or code that can be enabled to establish and/or implement an energy efficiency control policy for the network device. In various embodiments, energy efficiency control policy entities 118 and 128 can be a logical and/or functional block which can, for example, be implemented in one or more layers, including portions of the PHY or enhanced PHY, MAC, switch, controller, or other subsystems in the host, thereby enabling energy-efficiency control at one or more layers.

In one example, energy efficient Ethernet such as that defined by IEEE 802.3az can provide substantial energy savings through a reduction in link rate to a sub-rate of the main rate. This sub-rating of the link enables a reduction in power, thereby leading to power savings. In one example, this sub-rate can be a zero rate, which produces maximum power savings.

One example of sub-rating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate (e.g., turning off three of four channels). In another embodiment, the subset PHY technique can be enabled by slowing down the clock rate of a parent PHY. For example, a parent PHY having an enhanced core that can be slowed down and sped up by a frequency multiple, can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

Another example of sub-rating is through the use of a low power idle (LPI) technique. In general, LPI relies on entering a quiet state where power savings can be achieved when there is nothing to transmit. Power is thereby saved when the link is off. Refresh signals can be sent periodically to facilitate an update of transmission parameters, which thereby facilitates a reduction in time to wake up the PHY from the sleep mode. In general, both the subset and LPI techniques involve turning off or otherwise modifying portions of the PHY during a period of low link utilization.

Figure 2:
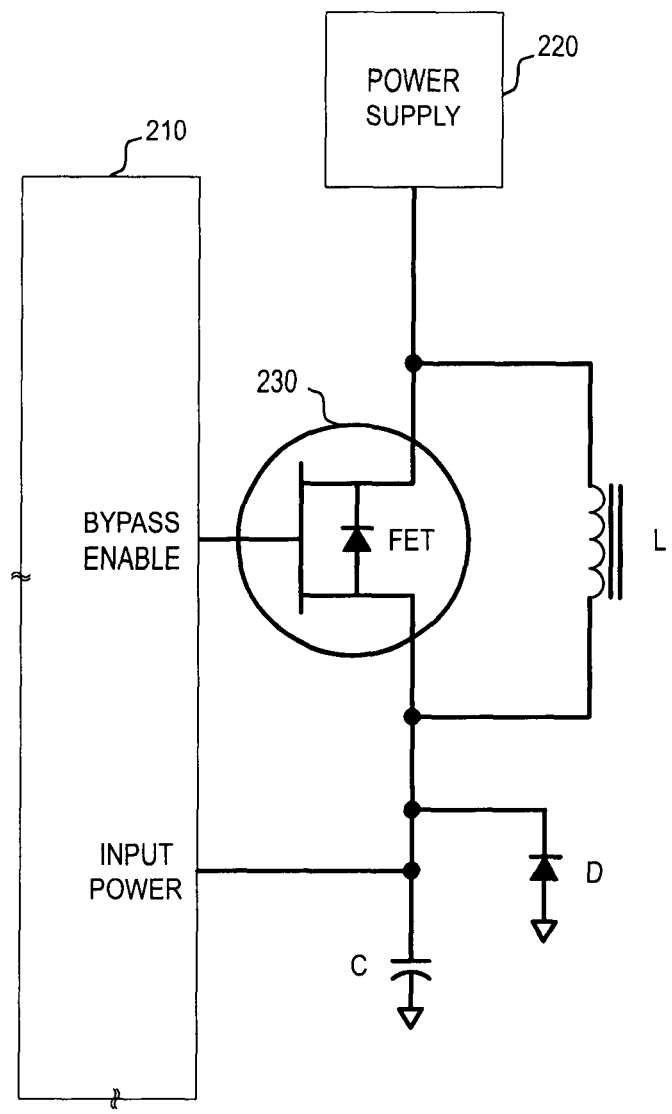
FIG. 2 illustrates an embodiment of a bypass module that can be used with a physical layer device that supports a plurality of operating modes.

FIG. 2 illustrates a high-level overview of a PHY that can support multiple operating modes that have different power requirements. In one example, PHY 210 can include a first module that supports a first operating mode and a second module that supports a second operating mode. In one scenario, the first module that supports the first operating mode can represent the suitable logic, circuitry, and/or code that enables PHY 210 to operate in a 10G mode, while the second module that supports the second operating mode can represent the suitable logic, circuitry, and/or code that enables PHY 210 to operate in a 1G/100M/10M mode.

As would be appreciated, the two separate operating modes can be supported by some logic, circuitry, and/or code that can be common between the two operating modes. For example, where a subset PHY technique is used, the suitable logic, circuitry, and/or code that supports the lower transmission rate (e.g., 1G) of the second operating mode can be a part of the suitable logic, circuitry, and/or code that supports the higher transmission rate (e.g., 10G) of the first operating mode.

In general, the example above is designed to highlight the functional differences between operating modes in supporting different energy saving states. Accordingly, the physical separation between the two modules would not necessarily be realized in an actual PHY implementation. For the purposes of the present invention, the usage of separate modules supporting the first and second operating modes is designed to highlight the separate activation of PHY functionality having different power requirements.

The modules that support the first and second operating modes are supplied with power via an external power rail (e.g., 1.8V) that is sourced by power supply 220. As illustrated, the external power rail is coupled to PHY 210 via inductor L.

In producing energy savings, an energy efficiency control policy can determine, based on one or more link utilization measures, to switch between energy saving states. In the context of FIG. 2, this switch can be exemplified by a deactivation of the module supporting the first operating mode, which supports a first energy saving state (e.g., higher power state), and a corresponding activation of the module supporting the second operating mode, which supports a second energy saving state (e.g., lower power state).

The action represented by the relative deactivation and activation of modules supporting the first operating mode and the second operating mode, respectively, produces a change in power drawn over the external power rail. Such a change in power drawn will produce a spike or lag in the change in current (dI/dt) drawn from the external power rail. This spike or lag in the change in current (dI/dt) will produce a corresponding spike or lag in the voltage across inductor L as the voltage across an inductor is governed by the relationship V=L*dI/dt. For example, a spike can occur during a transition from a high current mode to a low current mode, while a sag can occurs during a transition from a low power mode to a high power mode.

The voltage spike produced by the deactivation/activation of PHY modules in rapidly switching between energy saving states needs to be suppressed. One solution for suppressing the voltage spike is to increase the size of capacitor C. For example, capacitor C can be increased from a 10 µF capacitor to a 150 µF capacitor. Such a change comes with significant expense due to the increased cost of the 150 µF capacitor relative to the 10 µF capacitor. Moreover, the increased size of capacitor C requires increased real estate on the printed circuit board (PCB).

As illustrated in FIG. 2, an external circuit is included to create a bypass path to suppress the voltage spike that would ordinarily occur during switching between energy saving states. This bypass path is created by external FET transistor 230, which enables current to bypass inductor L when switching between modes that support different energy saving states.

More specifically, external FET transistor 230 is responsive to a bypass enable control signal that is generated by PHY 210. In one example, the bypass enable control signal is a pulse required to turn on external FET transistor 230 via an external pin on PHY 210. This pulse can be designed to turn on external FET transistor 230 at a time proximate to the switching between energy saving states. The creation of the bypass path around inductor L would therefore suppress the voltage spike that would have been produced during switching between energy saving states. A standard-sized capacitor C can therefore be utilized without incurring the penalty of an increased bill of materials (BOM) or increased PCB real estate.

As would be appreciated, the specific type of FET or switching mechanism used to create the bypass path would be implementation dependent. In general, any component that can be responsive to a switching control signal in generating an inductor bypass path can be used.

Figure 3:
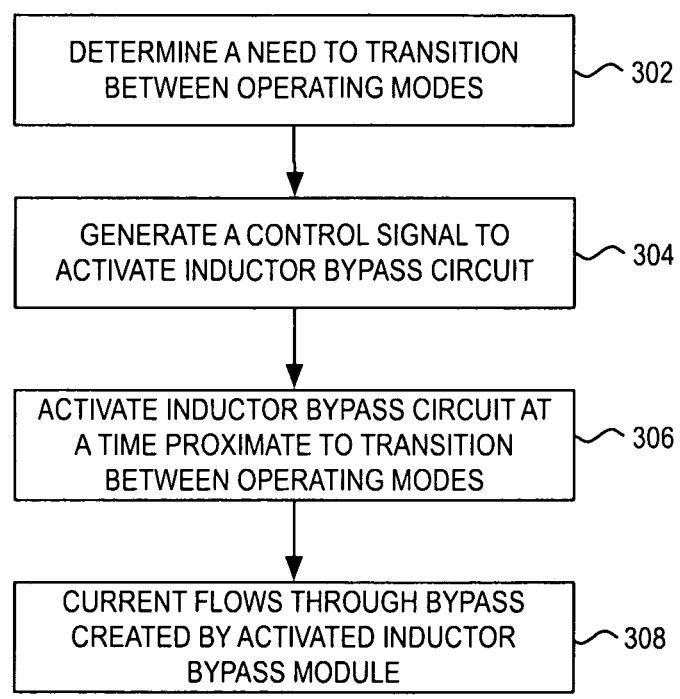
FIG. 3 illustrates a flowchart of a process of the present invention.

Having described an example of an external circuit that can be used to create a bypass path, reference is now made to the flowchart of FIG. 3 to illustrate a process of the present invention. As illustrated, the process begins at step 302 where an energy efficiency control policy determines a need to transition between operating modes. As would be appreciated, the determination of a need to transition between operating modes can be based on various link utilization measures (e.g., queue/buffer depths, traffic statistics, etc.), network device state indications (e.g., PCI bus power management state, processor state, etc.), or any other inputs or measures that can be used to discern utilization of a link.

Upon a determination of a need to transition between operating modes by the energy efficiency control policy, a control policy assist module implemented in the PHY can be used to carry out the decision that is communicated by the energy efficiency control policy to the PHY. As part of carrying out the energy efficiency control policy decision, the control policy assist module in the PHY can be designed to generate, at step 304, a control signal to activate the inductor bypass circuit. This control signal would be designed to activate, at step 306, the inductor bypass circuit at a time that is proximate to the transition between operating modes in the PHY. In other words, the control signal would be designed to activate the inductor bypass circuit at a time when the voltage spike would be expected to occur.

At step 308, the activation of the inductor bypass circuit would then serve to create a bypass path through which the current drawn during the change in operating modes can flow. The flow of the current through the bypass path created by the activated inductor bypass module would effectively suppress the voltage spike that would have been created by the inductor.

As has been described, the inclusion of an external circuit that can create an inductor bypass path can be controlled in a manner that facilitates changes in operating modes. The example provided above was in the context of the switching between modes as governed by an energy efficiency control policy. Such an example is not intended to be limiting to the principles of the present invention. More generally, the principles of the present invention can be used to facilitate switching between any two energy saving states that can produce a rapid change in current drawn on an external power rail. As such, the principles of the present invention can be used to support rapid switching between conventional operating modes (e.g., 10G mode to 1G mode).

It should also be noted that the principles of the present invention are not confined to a PHY. More generally, the inductor bypass mechanism described above can be used to facilitate switching between operating modes having different power profiles in any device that is susceptible to a voltage spike generated by an inductor.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system, comprising:
a physical layer device that supports first and second operating modes that consume different amounts of power, said physical layer device also generating a control signal proximate to a time of transition between said first and second operating modes;
a power supply that supplies power to said physical layer device, said power supply being coupled to said physical layer device via an inductor; and
a bypass module, a first end of said bypass module being coupled to a first end of said inductor, and a second end of said bypass module being coupled to a second end of said inductor, said bypass module being activated by said control signal to create a bypass path for current produced during said transition of said physical layer device between said first and second operating modes.

2. The system of claim 1, wherein said bypass module includes a field effect transistor.

3. The system of claim 1, wherein said first operating mode is a 10G operating mode and said second operating mode is a 1G or lower operating mode.

4. The system of claim 1, wherein said first operating mode is an active mode and said second operating mode is an energy saving mode.

5. The system of claim 4, wherein said energy saving mode is a low power idle mode.

6. The system of claim 4, wherein said energy saving mode is a subset physical layer device mode.

7. The system of claim 1, wherein said control signal activates said bypass module during a time period that covers said transition between said first and second operating modes.

8. A physical layer device, comprising:
a controller that enables switching between first and second operating modes supported by the physical layer device, said first and second operating modes consuming different amounts of power, said power being provided by a power supply that is coupled to said physical layer device via an inductor; and
a control signal pin, said control signal pin carrying a control signal generated by said controller, said control signal being used to reduce an amount of current that flows through said inductor during a transition between said first and second operating modes.

9. The physical layer device of claim 8, wherein said control signal is used to activate a bypass module that is coupled to said inductor.

10. The physical layer device of claim 8, wherein said first operating mode is a 10G operating mode and said second operating mode is a 1G or lower operating mode.

11. The physical layer device of claim 8, wherein said first operating mode is an active mode and said second operating mode is an energy saving mode.

12. The physical layer device of claim 11, wherein said energy saving mode is a low power idle mode.

13. The physical layer device of claim 11, wherein said energy saving mode is a subset physical layer device mode.

14. A method, comprising:
generating a control signal by a device that supports a first operating mode and a second operating mode that consume different amounts of power, said device receiving power from a power supply that is coupled to said device via an inductor, said control signal being proximate in time to a transition between said first operating mode and said second operating mode;
receiving said control signal in a bypass module, said bypass module being coupled to said inductor; and
activating said bypass module in response to said generated control signal, wherein activation of said bypass module creates a bypass path that reduces a flow of current through said inductor during said transition of said device between said first operating mode and said second operating mode.

15. The method of claim 14, wherein said bypass module includes a field effect transistor.

16. The method of claim 14, wherein said first operating mode is a 10G operating mode and said second operating mode is a 1G or lower operating mode.

17. The method of claim 14, wherein said first operating mode is an active mode and said second operating mode is an energy saving mode.

18. The method of claim 17, wherein said energy saving mode is a low power idle mode.

19. The method of claim 17, wherein said energy saving mode is a subset physical layer device mode.

20. The method of claim 14, wherein said control signal activates said bypass module during a time period that covers said transition between said first and second operating modes.

* * * * *